Patented Jan. 12, 1926.

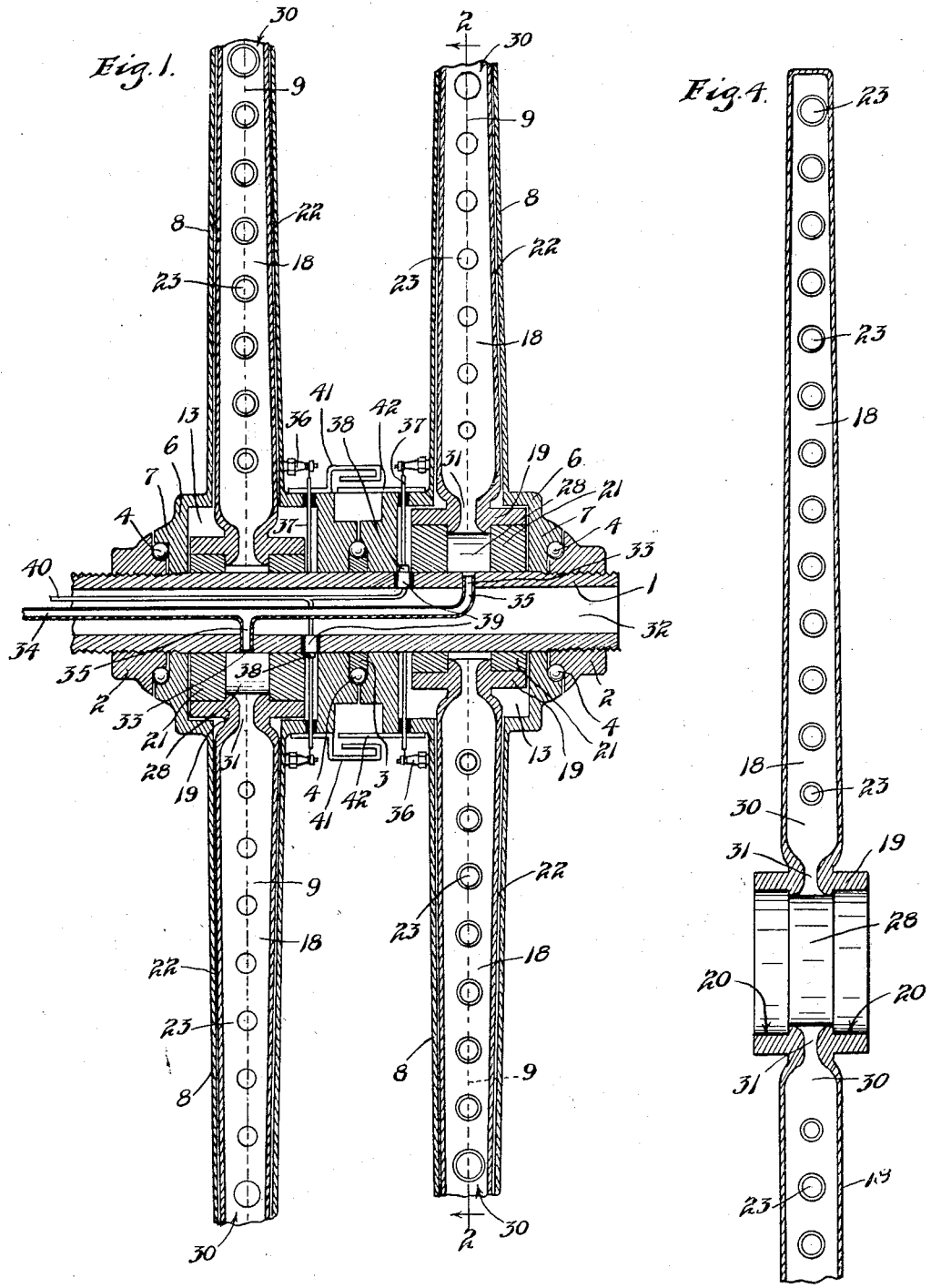

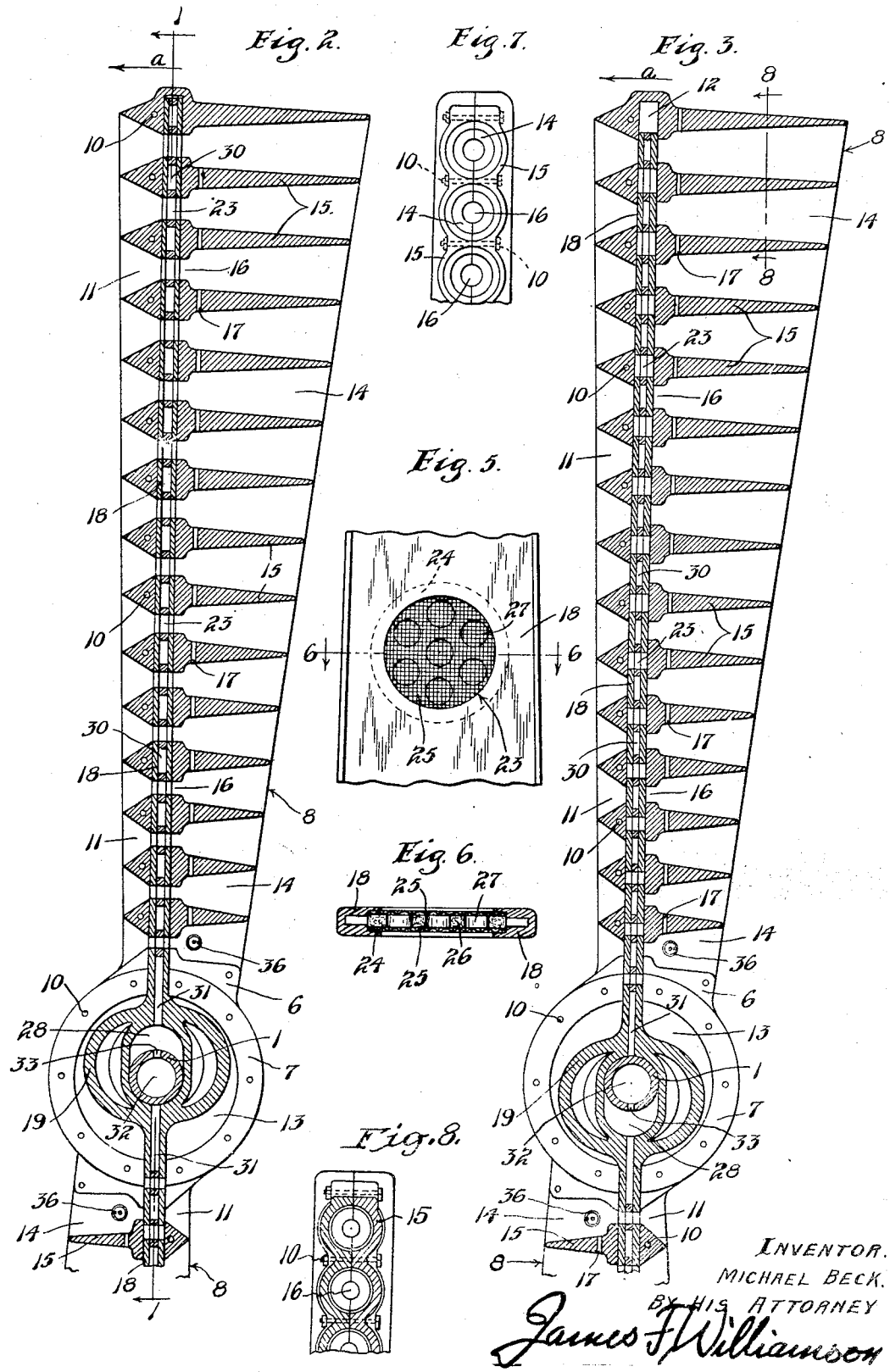

1,569,607

UNITED STATES PATENT OFFICE.

MICHAEL BECK, OF MINNEAPOLIS, MINNESOTA.

COMBINED EXPLOSIVE MOTOR AND PROPELLER.

Application filed October 13, 1920. Serial No. 416,744.

*To all whom it may concern:*

Be it known that I, MICHAEL BECK, a citizen of the United States, residing at Minneapolis, in the county of Hennepin and State of Minnesota, have invented certain new and useful Improvements in Combined Explosive Motors and Propellers; and I do hereby declare the following to be a full, clear, and exact description of the invention, such as will enable others skilled in the art to which it appertains to make and use the same.

This invention relates to a rotary explosive motor, and particularly to one which is adapted to be directly connected to some form of rotary propeller. The motor is of a type which is propelled by the firing or explosion of a mixture of air and suitable gas. While the motor is capable of many and varied applications, it is designed to be especially efficient as an aeroplane motor.

It is an object of this invention to provide a motor in which the rotary impulse results directly from the explosion.

It is a further object of the invention to provide a motor taken on the line 1—1 of Fig. 2, as indicated by the arrows, having an explosion chamber which is open to the atmosphere.

Another object of the invention is to construct such a motor having a series of such explosion chambers which may be fired successively with extreme rapidity.

These and other objects of the invention will become apparent as the description proceeds, in connection with the accompanying drawings, in which like reference characters refer to the same parts throughout the different views, and in which Fig. 1 is a central vertical section through the central shaft and main portion of the motor;

Fig. 2 is a central section taken on line 2—2 of Fig. 1;

Fig. 3 is a similar section showing the motor inverted from the position shown in Fig. 2, and showing the lower or other end thereof;

Fig. 4 is a central vertical section of the gas chamber;

Fig. 5 is a side view of a portion of the gas chamber;

Fig. 6 is a section taken on the line 6—6 of Fig. 5;

Fig. 7 is a partial view in side elevation of the end of applicant's device as shown in Fig. 2; and Fig. 8 is a partial vertical section taken on the line 8—8 of Fig. 3, as indicated by the arrows.

Referring to the drawings, the device comprises a central fixed shaft 1 shown as secured in bearings 2 which may form part of any desired frame or fixed structure upon which the motor is to be mounted. Secured centrally of the shaft 1 is also shown a fixed bearing 3. Mounted to rotate on ball bearings 4 which seat upon bearings 2 and 3, are the rotary members 6. As the members 6 are similar in construction, a description of one will suffice for both.

The member 6 is formed with two parts which, together, comprise a pair of arms 8 extending in diametrically opposite directions from the central cylindrical casing 7. In one dimension, the arms 8 increase in width from the casing 7, as clearly shown in the sectional views of Figs. 2 and 3. As stated, each arm 8 comprises two sections which are divided but fitted for close contact along the dotted line 9 in Fig. 1, and which parts are bolted or secured together by other suitable fastening means arranged to pass through holes 10. In the other dimension from that shown in Figs. 2 and 3, the arms 8 are slightly tapered as shown in Fig. 1. On one side of the arm 8, which is the forward side, in the direction of rotation, as shown by arrow *a* in Fig. 2, are formed converging recesses 11 having an opening at their inner end which communicates with the chamber 12 which extends longitudinally of the member 8 and communicates with an opening 13 in casing 7. Formed on the rear side of the arm 8 are a series of flaring openings 14 divided by partitions 15. The openings 14, likewise, have a smaller opening 16 at their inner end, which also communicates with chamber 12. Extending through all of the members 15, near the inner end of openings 14, are small ports or openings 17.

From the above description, it will be seen that the two parts of member 8 as secured together, form a member having the chamber 12 extending from end to end thereof, which chamber is open to the atmosphere only at the apertures at the inner ends of chambers 11 and 14. Arranged to be enclosed in this chamber 12 and in the chamber 13, is a member 18 which forms a gas carrying chamber which is shown in section in Fig. 4. The member 18 has a hub 19 formed centrally thereof which is bored at opposite sides and finished to form eccentric seats 20. These seats 20 are arranged to embrace and form bearings or straps for eccentrics 21 which are rigidly secured to shaft 1. In one dimension, as shown in Fig 1, the outer part of the member 18 is disposed loosely in the chamber 12 of the member 8, a small space 22 being left between the walls thereof, in the other dimension, however, as shown in Figs. 2 and 3, the member 18 is finished to fit snugly in the walls of the chamber 12. From the structure just described, it will be seen that as the member 6 revolves, the member 18 will be reciprocated therein. Different positions of this member 18 in relation to the ends of member 3 are shown in Figs. 2 and 3. The member 18 has formed in its outer portions a series of apertures 23 which are made successively larger toward the outer end. Adjacent these apertures, the walls of member 18 are counterbored, as shown at 24, to form seats for a disk of fine mesh screen 25 (see particularly Fig. 6). Disposed between the screen sections 25, is a perforated pad 26, having a plurality of holes 27 therethrough.

As shown in Fig. 1, a chamber 28 is formed between eccentrics 21, which chamber communicates with chamber 30 in the outer parts of member 18 through an orifice 31. The shaft 1 is hollow, having an opening 32 extending therethrough, and from this opening 32, apertures 33 pass into the chamber 28. A pipe 34 is disposed axially of the opening 32 and has branches 35 which fit into the orifices 33. The pipe 34 is designed to connect with some supply of combustible fuel or gas which will be fed therethrough by air pressure or other suitable means, as well as by centrifugal force.

In the opening 14, nearest the casing 7 is disposed a spark plug 36 which is carried in the wall of member 8. A connection 37 extends from the outer side of this spark plug to a brush 38. This brush is arranged to contact and travel upon a segment 39 which is set in shaft 1, and with which connects with a conducting member 40 which is designed to be connected with a suitable ignition device to supply current at appropriate times to cause a spark.

As stated, there are two members 8 shown as composing the motor, which are of similar construction. In the operation of the motor, these members rotate in opposite directions. In Fig. 1 is shown a form or bracket 41 carried on the member 8 shown on the left hand side and a bracket or form 42 shown on the member on the right hand side. The form 41 is designed to receive a field winding and the form 42 to carry an armature winding co-operating therewith. When the motor is operating at high speed, these parts will form a generator, a current of which can be commutated and used for any desired purpose.

The operation of the motor is as follows:

The gas or other fuel is conveyed into chamber 28 by a pipe 34 and is urged outwardly through the orifice 31 in the chamber 30, as the motor revolves. The same is thrown out in contact with the pads 26, which, as stated, successively of larger area the farther they are from the center. The reciprocation of member 18 relative to the arms 8 causes the openings 23 to align with the openings 16 in member 8. As the arms 8 revolve in the direction of the arrows, air will be forced through these aligned openings. This air will pass through the screens 25, the pads 26 which have become saturated with the fuel, and the fuel will thus be carbureted and a mixture thereof with the air will pass into openings 14. The member 18 will then be moved in the opposite direction and the openings in it and the arms 8 will be moved out of alignment, so that the bottoms of chamber 14 are closed, as shown in Fig. 3. As the openings 15 are smaller near the axis, these openings will be closed first and the other openings will be closed in succession, accordingly as they are distant from the axis. At approximately the instant that the opening 16 nearest the axis is closed, the spark is timed to occur and fire the mixture in said chamber. An explosion will then take place and the flame therefrom will be transmitted through openings 17 to the mixture in the other chamber 14 whose orifices have now been closed. It will be noted that the firing of the successive chambers will take place, either through the orifices 17 or around the partitions 15. The chambers are fired, one after the other in extremely rapid succession. As one end of the chambers is open, the force of the explosion will tend to rotate the members 8 in the direction of the arrow a. When the motor is first started, rotation is comparatively slow, but after several cycles, a high degree of speed is attained. As the arms 8 rotate at high speed, there is a tendency for the air and burned gas to accumulate or stay in the chambers 14. When the member 18 is reciprocated to open the port 16, the air tends to rush through said orifices and carry the explosive mixture thereinto. This action is resisted by the air, or other gas already in these chambers, and a considerable degree of compression of the explosive mixture results. This, of course, adds to the force of the explosion and increases the efficiency of the motor. This effect is greater, the greater the speed, so that at high speed, at which this motor is designed to run, there is a high degree of compression.

It is, of course, obvious that vaned propellers or other desired driven means can be designed to be connected with the arms 8, or the member 6. In case the double motor shown is used for an aeroplane propeller construction, the blades of the propellers connected to the two motors would have to be arranged with opposite pitch.

It will be noted that the two members 6 and 8 are arranged symmetrically centrally of the shaft 1. The two parts of the motor which revolve in opposite directions will be so articulated with the ignition that one motor will be fired approximately diametrically opposite to the other. This results in a perfectly balanced motor and greatly relieves the strains produced therein.

It will also be noted that the motion of the member 19 will result in a pumping action of the shaft 1 in the casing 28, so that the fuel in said casing will be forced out through openings 31. This will be particularly advantageous when the motor is starting and running at slow speeds.

From the above description it will be seen that applicant has produced a novel explosive motor which is composed of comparatively few and simple parts and which is designed to operate at high speed.

Generally stated, the invention consists in the structure shown and described and particularly set forth in the appended claims.

What is claimed is:

1. An explosive motor having in combination a rotatable arm, said arm having a flaring open-ended chamber having a free outlet therein, positively operated means slidable in said arm for admitting an explosive mixture to the smaller end of said chamber, and means for firing said mixture.

2. An explosive motor comprising a rotary abutment arm, said arm having a plurality of open-ended chambers formed therein increasing in size progressively from the axis of rotation, means for supplying an explosive mixture at one end of said chambers and means for firing said chambers in succession to rotate said arm.

3. An explosive motor having in combination a rotatable arm, a flaring chamber forming one side thereof and opening into the atmosphere, said chamber having a port at its smaller end, a positively operated slidable valve for opening and closing said port to admit an explosive mixture into the end of said chamber, and means for firing said explosive mixture.

4. An explosive motor having in combination a rotatable arm, having formed therein a plurality of flaring chambers, said chambers increasing in volume outwardly from the axis of rotation, ports at the smaller ends of said chambers, and a slidable member common to all of said ports constituting a valve means for admitting an explosive mixture into said chambers, and means for firing said chambers successively.

5. An explosive motor having in combination a rotatable arm having formed therein a plurality of open-ended flaring chambers and having a chamber extending longitudinally thereof, ports in the first mentioned chambers communicating with said longitudinal chamber, a hollow reciprocating member adapted to slide in said longitudinal chamber, said reciprocating member comprising valve and carbureting means.

6. An explosive motor having in combination a rotatable arm, a longitudinal chamber formed therein and a plurality of transversely extending open-ended flaring chambers having ports at their lower ends communicating with said longitudinal chamber, a plurality of open ended flaring chambers opposite to said first mentioned transversely extending chambers also having ports communicating with said longitudinal chamber, and a carbureting means movable into and out of alignment with said ports.

7. An explosive motor comprising a central casing diametrically oppositely extending arms secured to said casing, each of said arms having a longitudinal chamber therein communicating with said casing, a reciprocating member located in said casing and having hollow arms extending into and slidable in said longitudinal chamber, said reciprocating member comprising valve and carbureting means.

8. An explosive motor having in combination a fixed hollow shaft, a hollow casing rotatably mounted thereon, said casing being provided with diametrically oppositely disposed arms, each of said arms having a longitudinal chamber formed therein and having oppositely disposed open-ended flaring chambers therein having their smaller ends communicating with said longitudinal chamber, and a reciprocating hollow member arranged to slide in said longitudinal chamber and constituting valve and carbureting means.

9. An explosive motor having in combination a stationary hollow shaft, a casing mounted for rotation thereon, said casing having diametrically oppositely extending arms, a longitudinal chamber formed in each of said arms communicating with the interior of the casing, transversely extending explosion chambers in each of said arms communicating with said longitudinal chamber, a pair of eccentrics, a member mounted thereon comprising a hollow casing and having hollow arms extending therefrom and adapted to slide in said longitudinal chambers, said arms carrying carbureting means and also constituting valve means.

10. An explosive motor having in combination a rotatable casing, a pair of oppositely disposed arms secured thereto, each of said arms having a longitudinal chamber therein and also having transversely disposed explosion chambers formed therein having ports communicating with said longitudinal chamber, a second casing rotatable inside of said first mentioned casing and having oppositely extended hollow arms slidable in said longitudinal chamber, said last mentioned arms having openings therein, carbureting means disposed in said openings and having means between said openings constituting valve means, said openings being moved into and out of alignment with said ports.

11. An explosive motor having in combination a stationary shaft, a casing mounted thereon for rotation having oppositely extending arms, a second casing mounted on said shaft adjacent said first mentioned casing for rotation in the opposite direction, and also having oppositely extending arms, the arms of both casings having transversely extended open-ended explosion chambers disposed therein, means for firing an explosive mixture in said chambers successively, and a common means for conducting fuel to said casing.

12. An explosive motor having in combination, a rotatable member, said member having formed therein an open ended chamber, the open end of which is directed oppositely to the direction of rotation of said member and is also free to the atmosphere, positively actuated means slidable longitudinally of said member for admitting an explosive mixture to the inner end of said chamber, and means for firing said mixture.

In testimony whereof I affix my signature.

MICHAEL BECK.